(12) United States Patent
Whitesell et al.

(10) Patent No.: US 10,264,158 B1
(45) Date of Patent: *Apr. 16, 2019

(54) METHOD FOR RETIRING RFID COPY SHEETS

(71) Applicant: LEXMARK INTERNATIONAL, INC., Lexington, KY (US)

(72) Inventors: Robert McAlister Whitesell, Georgetown, KY (US); Brandon Christopher Reynolds, Nicholasville, KY (US); Donnie Eugene Proffitt, Richmond, KY (US); Jeremy Keith Payne, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/829,268

(22) Filed: Dec. 1, 2017

(51) Int. Cl.
*H04N 1/32* (2006.01)
*H04N 1/00* (2006.01)
*H04N 1/44* (2006.01)
*G06K 7/10* (2006.01)
*G06K 1/12* (2006.01)

(52) U.S. Cl.
CPC ......... *H04N 1/32138* (2013.01); *G06K 1/126* (2013.01); *G06K 7/10227* (2013.01); *G06K 7/10257* (2013.01); *H04N 1/00342* (2013.01); *H04N 1/00413* (2013.01); *H04N 1/4413* (2013.01)

(58) Field of Classification Search
CPC .................. H04N 1/32138; G06K 1/126
See application file for complete search history.

(56) References Cited

U.S. PATENT DOCUMENTS

| | | | |
|---|---|---|---|
| 8,161,409 B2 | 4/2012 | Wolff | |
| 8,313,187 B2* | 11/2012 | Barnett | B41J 3/50 347/101 |
| 9,147,300 B2 | 9/2015 | Huang | |
| 2002/0170973 A1 | 11/2002 | Teraura | |
| 2008/0088454 A1* | 4/2008 | Flores | G08B 13/2457 340/572.4 |
| 2013/0161382 A1* | 6/2013 | Bauer | G06K 1/121 235/375 |

\* cited by examiner

*Primary Examiner* — Ibrahim Siddo (57) ABSTRACT

A method for retiring a RFID copy sheet using an imaging device having a scanner system and a printer system, each system having a RFID reader programmer. The RFID copy sheet to be retired is scanned using one of the RFID reader programmers. After determining that the user is authorized to retire the RFID copy sheet, the RFID copy sheet is rescanned by a RFID reader programmer and its associated RFID tag is reprogrammed to indicate that the RFID copy sheet is retired. Document control of the retired RFID copy sheet may also be provided using a document lifecycle database that is updated with the retired status of the RFID copy sheet.

5 Claims, 8 Drawing Sheets

METHOD FOR RETIRING RFID COPY SHEETS

CROSS REFERENCE TO RELATED PATENT APPLICATIONS

This application is related to U.S. patent application Ser. No. 15/829,040, entitled "Method For Creating RFID Copy Sheets" filed concurrently herewith and assigned to the assignee of the present disclosure.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to a method of controlling the distribution of a RFID copy sheet and, more particularly, to a method for retiring a RFID copy sheet.

2. Description of the Related Art

Figure 4:
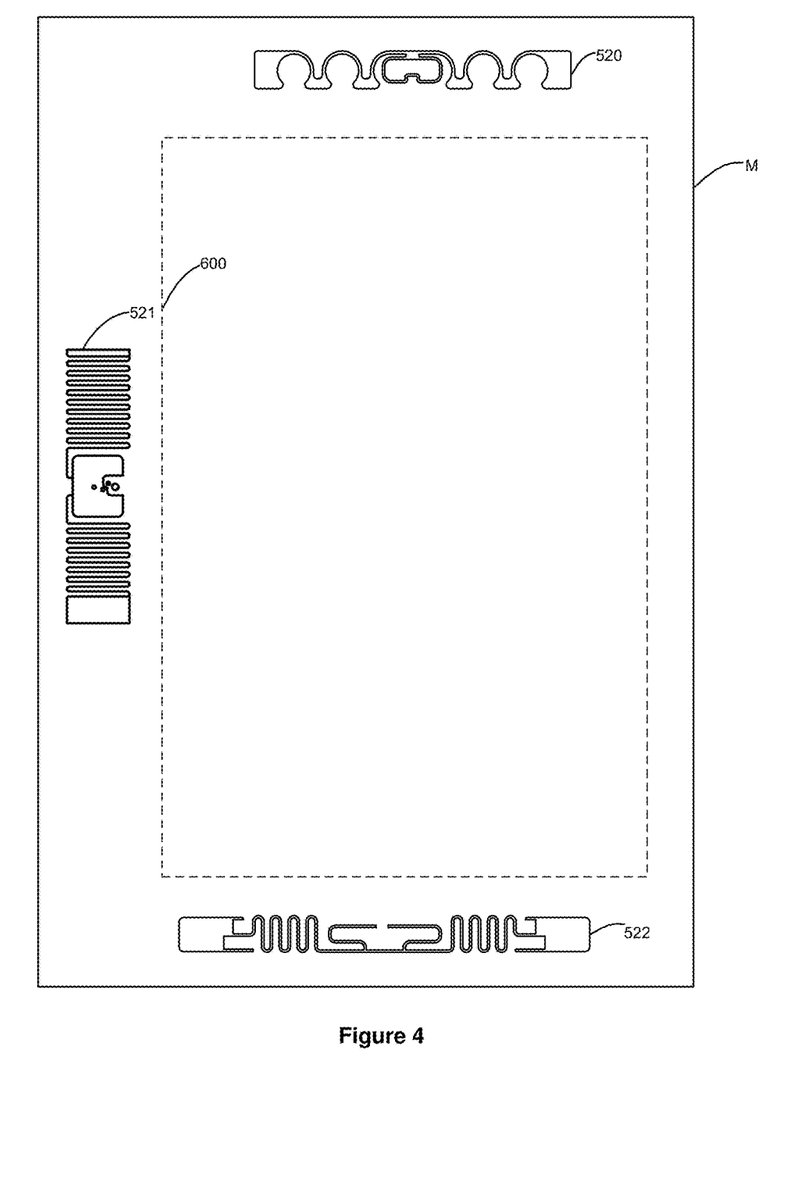
FIG. 4 is an example of a media sheet illustrating locations of RFID tags thereon.

Radio frequency identification (RFID) systems have been widely employed for tracking items having an attached RFID tag. Media sheets for use in imaging devices may have RFID tags attached as shown in FIG. 4. The RFID tags typically have an adhesive layer allowing them to adhere to one surface of the media sheet in various locations as shown in FIG. 4. The use of RFID tags on media sheets allows for control over the distribution and copying of such media sheets after they are printed. Also, an original document sheet not having a RFID tag may be copied onto a blank RFID media sheet allowing for subsequent control of the RFID copy sheet due to relatively low implementation cost.

As is known in the art, there are imaging devices including a document scanner and printer as well as a RFID reader/programmer positioned along the media path allowing a document to be scanned and then printed on RFID sheets. These RFID reader programmers can also be used to reprogram the RFID tags on the RFID copy sheets. It would be advantageous to be able to retire RFID copy sheets of scanned original documents for purposes including document control and document security.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back" and "side", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

Figure 1:
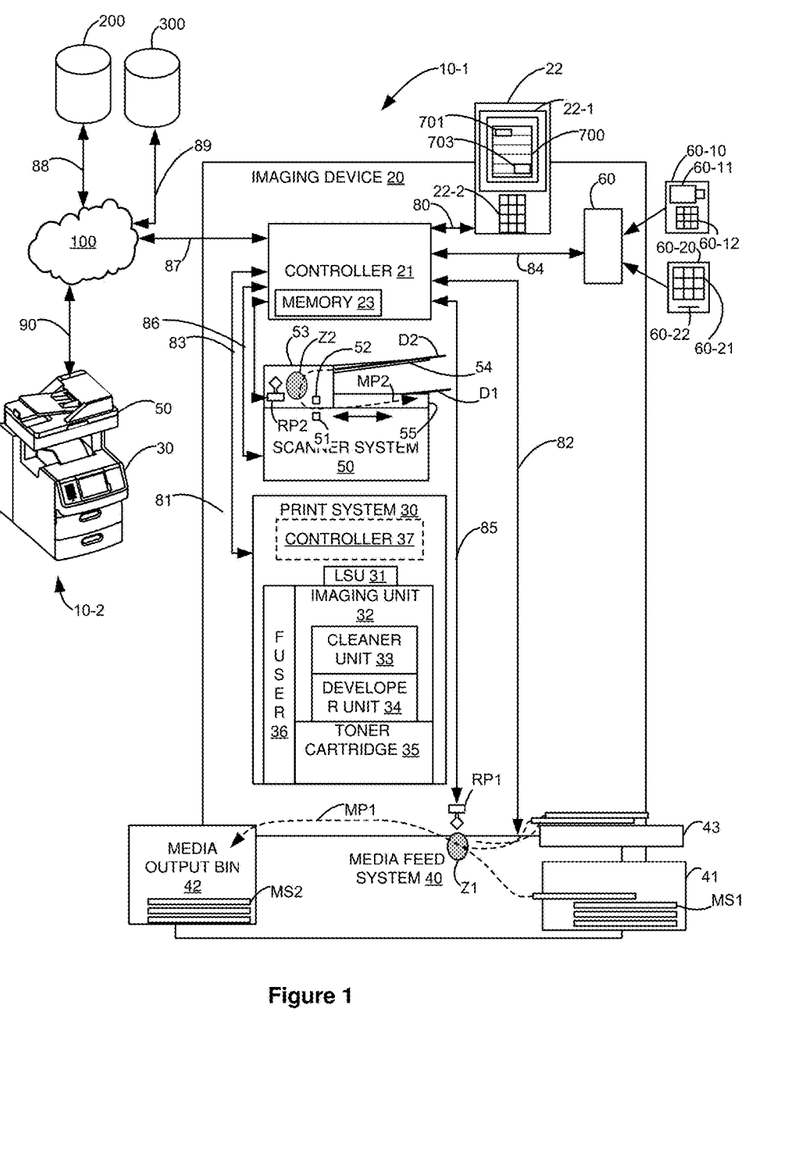
FIG. 1 is a block diagram of an imaging system utilizing the presently disclosed method of creating a RFID copy.

Referring now to the drawings and particularly to FIG. 1, there is shown a block diagram depiction of an imaging system 10-1 according to one example embodiment. Imaging system 10-1 includes an imaging device 20 connected to a network 100 via a communication link 87. Network 100 is shown connected to two databases, databases 200, 300 via communication links 88, 89, respectively. Database 200, also referred to as a user credentials database 200, contains user credential data such as an employee ID or stored user biometric data, the level of access a given user has in creating, copying or retiring a RFID document or a class of RFID documents, etc. Database 300, also termed a document lifecycle database, contains data associated with the RFID tag on a given document. This data would mirror the data contained in the RFID tag of the document and includes the RFID tag ID, RFID user data, individuals allowed to copy or retire the document, a total number of copies allowed, document metadata, and an expiration date. Databases 200, 300 are shown as two separate databases for purposes of illustration only and other configurations may be used. For example the two databases 200, 300 may be a single database and the listing of the data contained therein is given only for purposes of illustration and not limitation.

As used herein, the term "communication link" is used to generally refer to structure that facilitates electronic communication between multiple components, and may operate using wired or wireless technology. Communications among components may be done via a standard communication protocol, such as for example, universal serial bus (USB), Ethernet or IEEE 802.xx.

In the example embodiment shown in FIG. 1, imaging device 20 is a multifunction machine (sometimes referred to as an all-in-one (AIO) device) that includes a controller 21, a user interface 22, a print system 30 including a media feed system 40, a scanner system 50 also referred to as document scanner 50, an authentication device 60 and two RFID reader programmers RP1, RP2.

User interface 22 includes a display 22-1 and a keypad 22-2. Print system 30 may include a laser scan unit (LSU) 31, an imaging unit 32 having a cleaner unit 33, a developer unit 34, a toner cartridge 35, and a fuser 36. Print system 30 may, in one example embodiment, have a controller 37. Media feed system 40 includes a media input tray 41 and a media output bin 42 and controls the feeding of media along a first media path MP1 from a first media stack MS1 in media input tray 41 through print system 30 to media output bin 42 using pick mechanisms and feed rolls as is known in the art. A second media stack MS2 is shown in media output bin 42. The first RFID reader programmer RP1 is provided along first media path MP1 and emits a first interrogation zone Z1, shown as a grey oval, across first media path MP1 and is used to read and program RFID tags on media sheets having RFID tags as they pass through the first interrogation zone Z1. A multipurpose feed tray 43 is also shown and is used to feed either a single media sheet or a small number of media sheets, usually less than fifty sheets, into the media path MP1 and through the interrogation zone Z1 of RFID reader programmer RP1. Multipurpose feed tray 43 may also be used to feed envelopes or other types of media into the media path MP1.

As later described with respect to FIGS. 3 and 4, media stack MS1 contains media sheets having unprogrammed RFID tags. Multipurpose feed tray 43 may also be used to feed media sheets having unprogrammed RFID tags as well as media sheets having programmed RFID tags, which media sheets are to be retired. For purposes of description, the media sheets in media stack MS1 are referred to as RFID copy sheets which will be printed with images from print system 30 that have been received from scanner system 50 and the RFID tag on the RFID copy sheet will be programmed by first RFID reader programmer RP1 with RFID user data extracted from a scanned original sheet or entered by a user received from first RFID reader programmer RP1. Media stack MS2 contains RFID copy sheets that have been printed with scanned images and have RFID tags that have been programmed by first RFID reader programmer RP1 in accordance with the present disclosure.

Scanner system 50 may include one or more scan bars, scan bars 51, 52 are shown, an automatic document feeder (ADF) 53 and its own media input and output trays 54, 55, respectively. A second RFID reader-programmer RP2 is also provided in ADF 53. ADF 53 moves document sheets to be scanned along a media path MP2 from input tray 54, through a second interrogation zone Z2, shown as a grey oval, emitted by second RFID reader programmer RP2, past scan bars 51, 52 where simplex or duplex scanning may occur, to output tray 55. Scan bar 52 is shown mounted in ADF 53 while scan bar 51 is shown translateably mounted in the base of scanner system 50 and is movable in a reciprocating manner as indicated by the double headed arrow. The output of ADF 53 may also be fed to output bin 42 using media feed system 40. Document sheet D1 is shown in output tray 55 while a second document sheet D2 that is about to be scanned is shown in input tray 54. The documents D1 and D2 are referred to as original documents for purposes of description and will be copied in accordance with the presently disclosed method. Scanned images and RFID user data from RFID tags, when present on the original documents, will be sent to controller 21 for processing and then printing and programming on a RFID copy sheet and its respective RFID tag.

An authentication device 60 may also be provided in imaging device 20 that is separate from user interface 22. Two example authentication devices 60-10, 60-20 are shown. Device 60-10 includes a camera 60-11 and a keypad 60-12. Device 60-20 includes a keypad 60-21 and a card reader 60-22. Keypad 22-2 on user interface 22 may also be used as an authentication device. The type and number of authentications devices used is a matter of design choice and not of limitation.

Controller 21 includes a processor unit and associated memory 23 and may be formed as one or more Application Specific Integrated Circuits (ASICs). Memory 23 may be any volatile or non-volatile memory or combination thereof such as, for example, random access memory (RAM), read only memory (ROM), flash memory and/or non-volatile RAM (NVRAM). Alternatively, memory 23 may be in the form of a separate electronic memory (e.g., RAM, ROM, and/or NVRAM), a hard drive, a CD or DVD drive, or any processing device convenient for use with controller 21. Controller 21 may be, for example, a combined printer and scanner controller.

In the example embodiment illustrated, controller 21 communicates with user interface 22 via a communication link 80. Controller 21 communicates with print system 30 via a communication link 81. Controller 21 communicates with media feed system 40 via a communication link 82. Controller 21 communicates with scanner system 50 via a communication link 83. Controller 21 communicates with authentication device 60 via a communication link 84. Controller 21 communicates with first and second RFID reader programmers RP1, RP2 via communication links 85, 86, respectively. Controller 21 processes print and scan data and operates user interface 22, print system 30, media feed system 40, scanner system 50, authentication device 60 and first and second RFID reader programmers RP1, RP2, during scanning of original documents and printing RFID copy sheets. Controller 21 is also in communication with a user authentication database 200 and a document life cycle database 300 via a network 100. Controller 21 is shown communicatively coupled to network 100 via communication link 87 while databases 200, 300 are communicatively coupled via communication links 88, 89, respectively. Imaging system 10-1 is also shown communicatively coupled to a second imaging system 10-2 that is located away from imaging system 10-1 and that is communicatively coupled via a communication link 90 to network 100. Imaging system 10-2 is structured in substantially the same manner as imaging system 10-1. As is known in the art, an original document may be scanned using imaging system 10-1 and printed out using imaging system 10-2. While multiple communication links are shown within imaging device 20, a single communication link between controller 21 and each of the other components that it controls or communicates with may be used as is known in the art.

The electrophotographic imaging process used in print system 30 is well known in the art and, therefore, will be only briefly described. During a printing operation, laser scan unit 31 creates a latent image on a photoconductive drum in cleaner unit 33. Toner is then transferred from the developer unit 34 to the latent image on the photoconductive drum to create a toned image. The toned image is then transferred, either directly or through an intermediate transfer belt, to a media sheet received from media input tray 41. Next, the toned image is fused to the media sheet in fuser 36 using heat and/or pressure and sent to an output bin 42 or to one or more finishing options such as a duplexer or finisher. Toner remnants are removed from the photoconductive drum using cleaner unit 33. As toner is depleted from developer unit 34, toner is transferred from toner cartridge 35 into developer unit 34. Controller 21 provides for the coordination of these activities occurring during the printing process.

Figure 2:
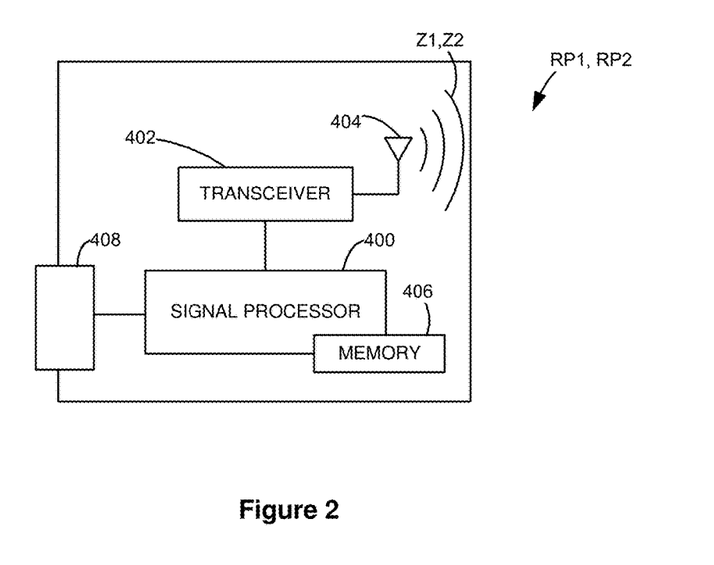
FIG. 2 is a schematic diagram of a RFID reader programmer used in the imaging system of FIG. 1.

FIG. 2 shows a schematic illustration of RFID reader programmers RP1, RP2 used to identify, read and program radio frequency identification (RFID) tags on the RFID copy sheets or on the original documents to be scanned, as the case may be. RFID reader programmers RP1, RP2 each includes a signal processor 400 and a radio transceiver 402, such as a radio transceiver or transponder, communicatively coupled to signal processor 400. Transceiver 402 is also communicatively coupled to an antenna 404, such as loop antenna 404, which is used to create the interrogation zones Z1, Z2. Signal processor 400 may include an associated memory 406 and may be a processor, microprocessor, controller and/or microcontroller formed as one or more Application Specific Integrated Circuits (ASICs). Memory 406 may be any memory device convenient for use with or capable of communicating with signal processor 400. Signal processor 400 may communicate with transceiver 402 and may serve to provide data for programming a RFID tag to transceiver 402 for transmission by antenna 404, or to receive data received from a RFID tag for processing. Signal processor 400 is also communicatively coupled to a communication chip 408 that is communicatively connected to controller 21. Communication chip 408, via communication links 85, 86, as applicable, transmits RFID tag data and RFID user data received from detected RFID tags and receives instructions from signal processor 400 and RFID user data to be programmed into a detected RFID tag.

Transceiver 402 may be derived from a wide variety of RFID readers capable of reading a number of passive, active, and/or semi-passive RFID tags simultaneously within the interrogation zone such as interrogation zones Z1, Z2. Transceiver 402 generally uses antenna 404 to transmit radio frequency signals to the RFID tags and receive response signals therefrom. Antenna 404 may be tuned to one or more frequencies at which transceiver 402 interrogates and communicates with a particular RFID tag within the interrogation zone Z1, Z2 as the case may be. Antenna 404 may be implemented with one or more antennae. In one example, transceiver 402 may have two or more antennae for localization. While RFID reader programmers RP1, RP2 are substantially identical, it will be apparent that RFID reader programmer RP2 may function only as a reader and not be used to program RFID tags found on original documents. Further, the design of RFID reader programmers RP1, RP2 is a matter of design choice and not of limitation.

Figure 3:
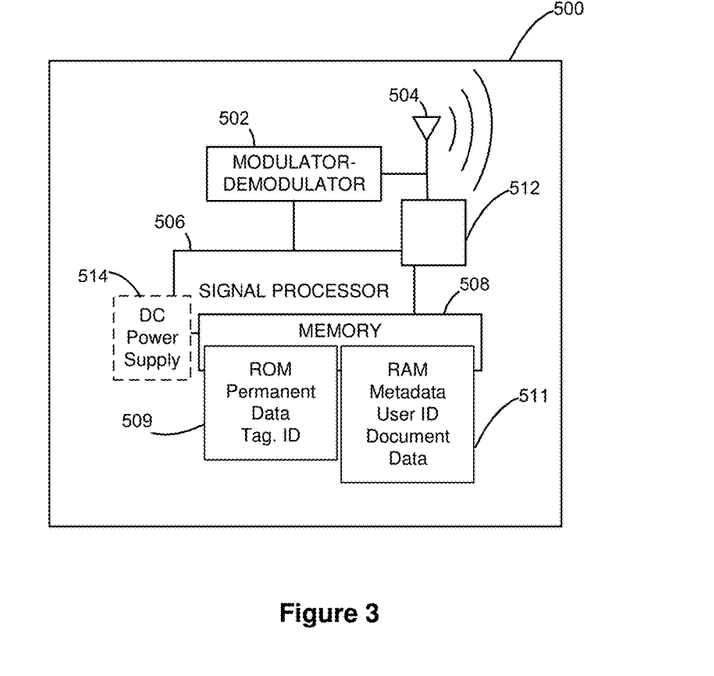
FIG. 3 is a schematic diagram of a RFID tag that may be used on media used with the imaging system of FIG. 1.

FIG. 3 illustrates a schematic example RFID tag 500 that may be found either on an original document or on a RFID copy sheet. Each RFID tag 500 can be passive, active or battery-assisted passive. An active RFID tag has an on-board battery and periodically transmits its RFID tag ID signal. A battery-assisted passive RFID tag has a small battery on board and is activated when in the presence of a RFID reader programmer. A passive tag is cheaper and smaller because it has no battery; instead, the tag uses the radio energy transmitted by the RFID reader programmer. However, to operate a passive tag, it must be illuminated with a power level roughly a thousand times stronger than for signal transmission. RFID tags may either be read-only, having a factory-assigned serial number that is used as a key into a database, or may be read/write, where object-specific data can be written into the tag by the system user. Field programmable tags may be write-once, read-multiple; blank tags may be written with an electronic product code by the user.

In general a RFID tag contains an integrated circuit for storing and processing information that modulates and demodulates a radio-frequency (RF) signal, a means of collecting DC power from the incident reader signal; and an antenna for receiving and transmitting the signal. The RFID tag information is stored in a non-volatile memory. The RFID tag includes either fixed or programmable logic for processing the transmission and sensor data, respectively.

RFID tag 500 may include a communications control unit 502, shown as modulator/demodulator 502, an antenna 504, signal processor 506, and associated memory 508. A passive tag would include a power scavenging circuit 512 to scavenge a portion of the energy received by antenna 504 and use it to power the RFID tag 500. An active RFID tag would include a DC power supply 514, such as a battery. When the RFID tag 500 is within an interrogation zone Z1 or Z2, the communications control unit 502 of each RFID tag 500 may decode and/or demodulate received information/interrogation signals from the respective RFID reader programmer RP1, RP2, as the case may be, and encode, modulate, and transmit information/response signals to the respective RFID reader programmer RP1, RP2 using antenna 504. Antenna 504 may be tuned to a frequency or frequencies at which transceiver 402 communicates with RFID tag 500. Memory 508 includes read only memory (ROM) 509 and random access memory (RAM) 511. ROM 509 is used to contain RFID tag data that is meant to be permanent data and includes a unique RFID tag identifier or ID. This RFID tag ID may be preprogrammed by the manufacturer, or, in an alternate form, may be programmed when first used. RAM 511 is used to contain what is termed RFID user data that can be written and/or altered. RFID user data can include document data such as date created, number of copies made, total number of copies allowed, imaging system that read and/or sent data to the RFID tag 500, and user metadata such as a user's authentication credentials and user ID. The data list is for purposes of example and not of limitation.

In operation, RFID reader programmers RP1, RP2 may broadcast a plurality of interrogation signals in the form of electromagnetic waves to RFID tags within their respective interrogation zones Z1, Z2. In response, the RFID tag on either the RFID copy sheet or the original document sheet that is within the respective interrogation zone may return a response signal in the form of electromagnetic waves to the interrogating RFID reader programmer RP1, RP2, respectively. The RFID reader programmers RP1, RP2 use characteristics of received response signals to determine information associated with the responding RFID tag on the sheets. For example, RFID reader programmer RP1 may collect the RFID tag data on the RFID tag on the RFID copy sheet while RFID reader programmer RP2 may collect the RFID tag data plus any RFID user data on the responding RFID tag on the original document sheet.

FIG. 4 illustrates an example media sheet M having a RFID tag thereon. Several examples of and locations for RFID tags on the media sheet are shown. Media sheet M represents either an original document sheet or a RFID copy sheet. When media sheet M is an original document sheet, it will typically have on one or both surfaces an image indicated by the dashed box 600. Three example RFID tags 520, 521, 522 are shown positioned within the top, left and bottom margins of media sheet M. RFID tags 520-522 typically have an adhesive layer for attaching them to the media sheet. For a thicker media sheet, the RFID tag may be embedded between the two surfaces of the media sheet. RFID tags 520, 521 are examples of a short dipole ultrahigh frequency (UHF) RFID tag. RFID tags 520, 521 have a preprogrammed RFID tag ID, 128 bits of EPC memory for storing user data and operate at 860-960 MHz. RFID tag 522 has a 32-bit tag ID, an unalterable 64-bit unique tag ID for authentication, an extensible EPC memory bank, 512 bits of user memory with password-protected read and write support capabilities to prevent unauthorized viewing and modification of the data on the RFID tag, and operates at 840-960 MHz. The type and location of the RFID tag is one of design choice and not of limitation.

Figure 5A:
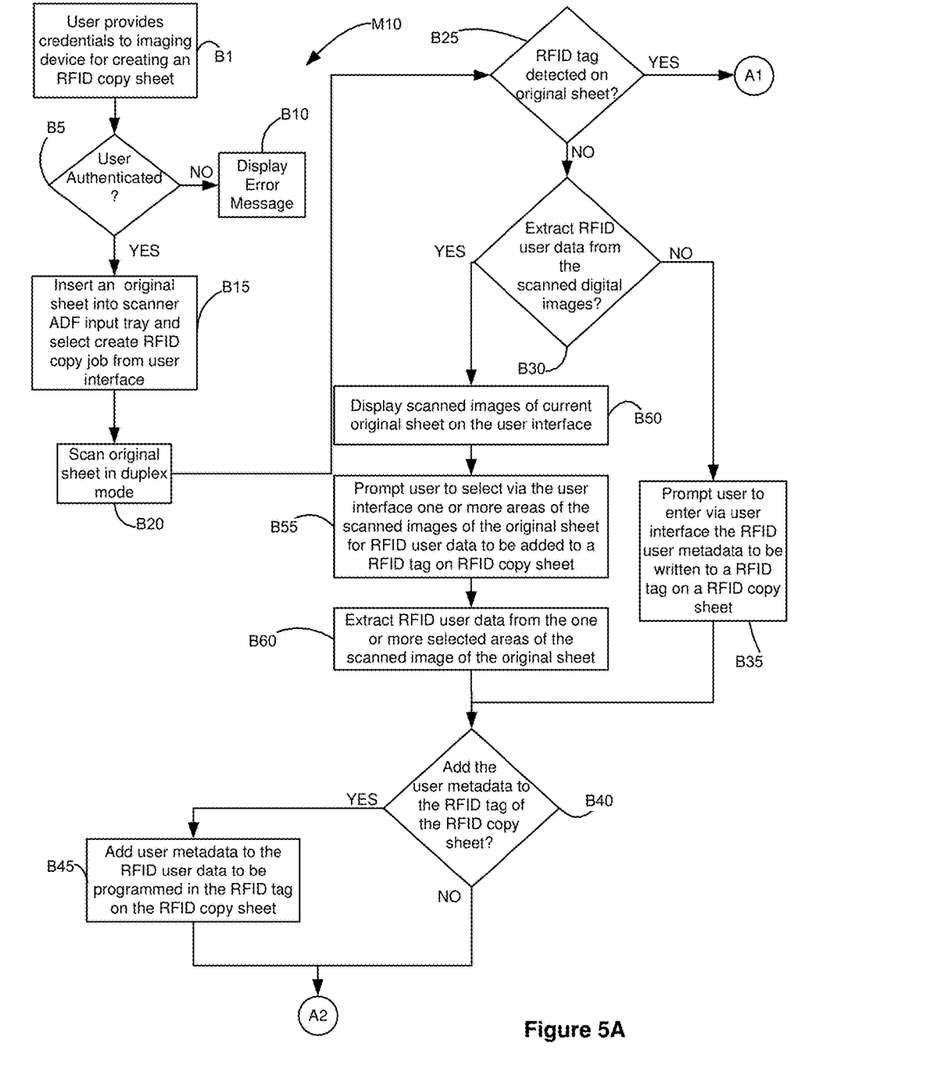
FIGS. 5A-5C are a flowchart illustrating an example method of creating RFID copy sheets according to example embodiments of the present disclosure; and, FIGS. 6A-6B are a flowchart illustrating an example method of retiring a RFID copy sheet according to example embodiments of the present disclosure.
Figure 5B:
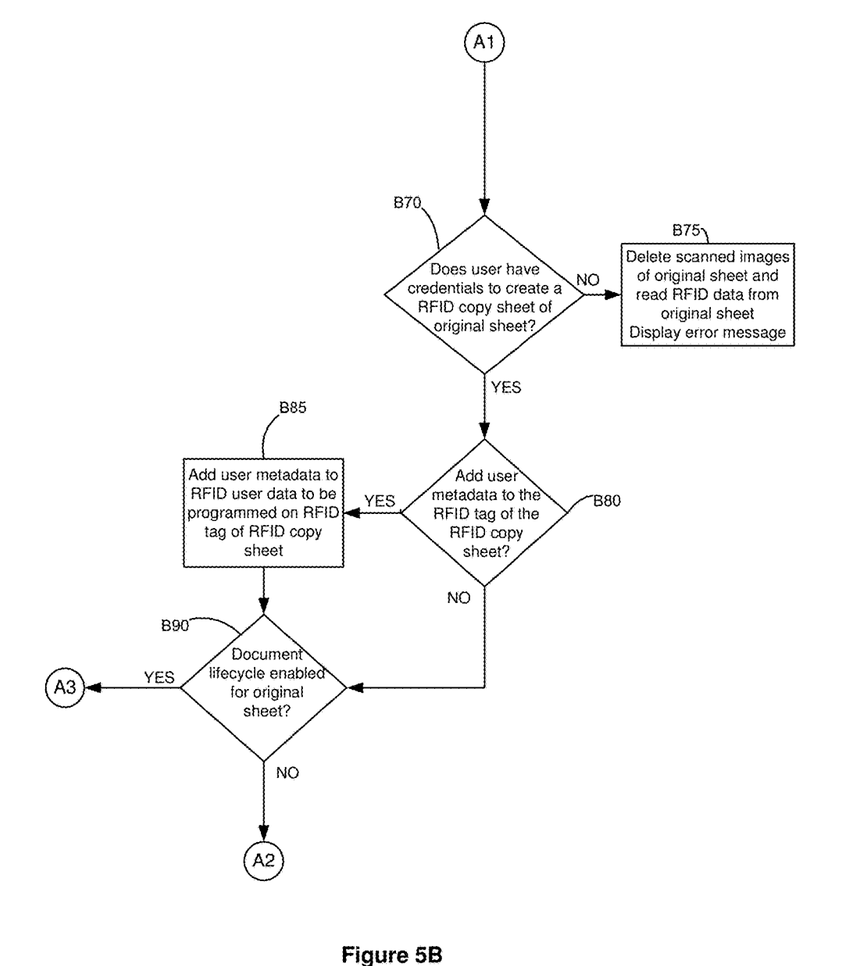
Figure 5C:
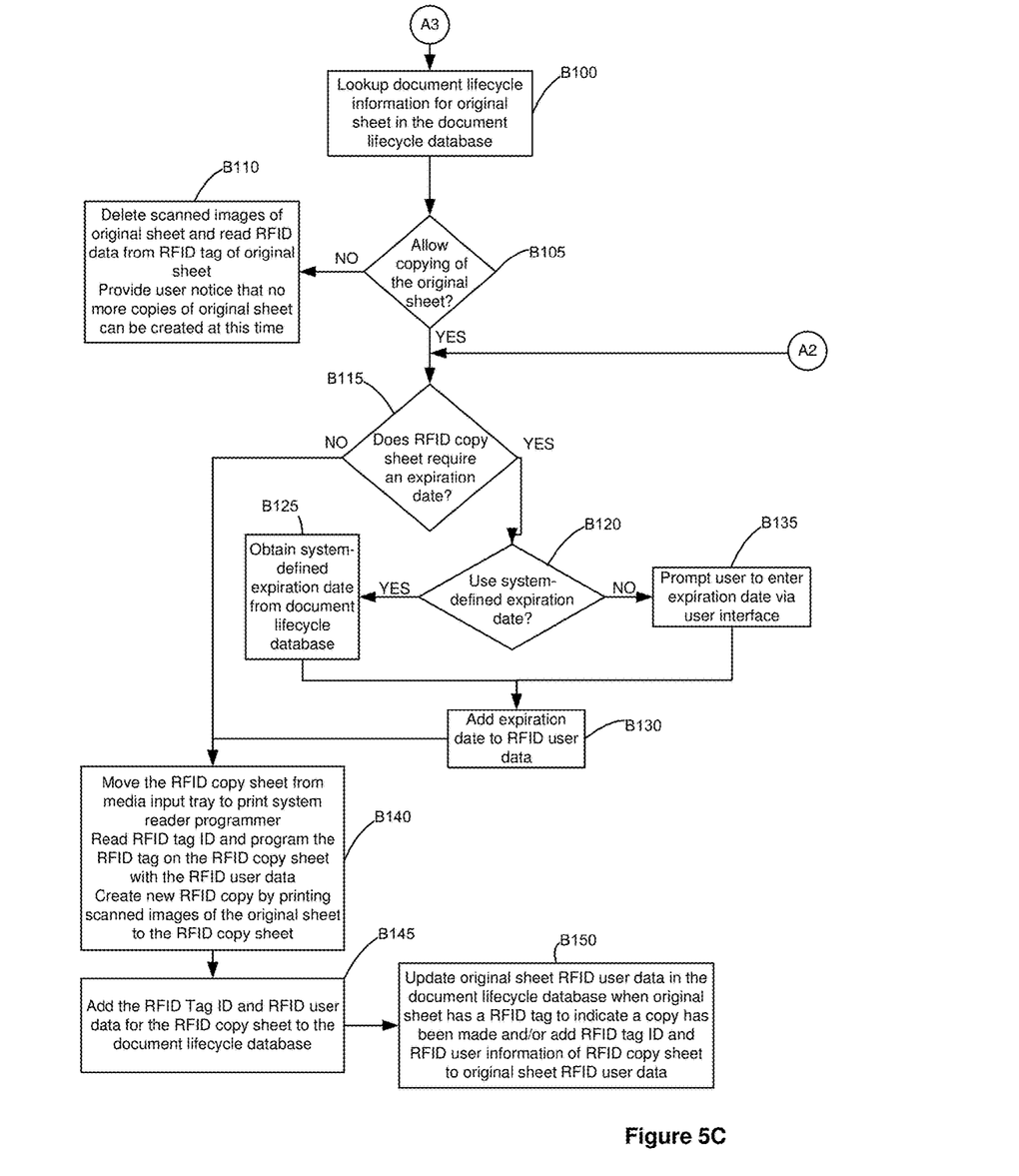

Referring to FIGS. 5A-5C, methods for creating RFID copies will be described. Generally, RFID copies are created for many reasons, among them, document security and document tracking. A RFID copy may be created from either an original document that does not have a RFID tag or from an original document carrying a RFID tag. Briefly, the method M10 comprises determining if a user has the credentials to create a RFID copy, determining if the original document has a RFID tag, determining what information to add to the RFID tag on the RFID copy sheet, adding that information to the RFID tag on the RFID copy sheet and then determining whether or not the RFID copy sheet needs document lifecycle control.

At block B1, a user desiring to make a RFID copy provides his credentials to the imaging device 20. This may be done using the authentication device 60 or the user interface 22. After entering the necessary credentials, a determination is made at block B5 whether or not to authenticate the user. This is done by querying the user credential database 200. When it is determined that the user does not have the correct credentials, at block B10 an error message is displayed on user interface 22. When it is determined that the user does have the correct credentials, at block B15, the original sheet is inserted into the scanner ADF input tray 54 and the user selects a "Create a RFID Copy" from a menu displayed on the user interface 22. Next, at block B20, the original sheet is scanned in duplex mode using scan bars 51, 52 creating digital images of each surface of the original sheet and moving the original sheet past RFID reader programmer RP2 through interrogation zone Z2 and sent to the scanner ADF output tray 55.

Method M10 proceeds to block B25 where a determination is made whether or not RFID reader programmer RP2 in scanner system 50 has detected a RFID tag. When no RFID tag is detected, method M10 proceeds to block B30 where a determination is made whether or not RFID user data is to be extracted from the scanned digital images. This may be done by displaying a query message on user interface 22 asking the user to select how to enter the RFID user data—extract or manually. When it is determined that a manual process is to be done, at block B35, the user is prompted to use the user interface 22 to enter the RFID user data to be written to a RFID tag on a RFID copy sheet onto which the digital images will be transferred.

Thereafter at block B40, a determination is made whether or not to append user metadata to the RFID tag of the RFID copy sheet. Again, the user may be prompted using user interface 22 to make a choice regarding the user metadata. When it is determined that user metadata is to be added, the user may be prompted using user interface 22 to manually enter this metadata and it can be automatically extracted from the digital images. User metadata can include but not be limited to the user name, imaging device ID, file size, file type, date created, etc. At block B45, the user metadata is added to the RFID user data to be programmed in the RFID tag of the RFID copy sheet.

After either the performance of block B45 or when it is determined at block B40 that no user metadata will be added, method M10 proceeds to block B115 (see FIG. 5C) where a determination is made whether or not the RFID copy sheet requires an expiration date. Again, the user may be prompted to make this choice via user interface 22 or imaging device 20 via document lifecycle database 300 can make the choice. When it is determined that the RFID copy sheet requires an expiration date, method M10 proceeds to block B120 where a determination is made whether or not to use a system-defined expiration date. Again, the user may be prompted via the user interface 22 to make this choice. When it is determined to use the system-defined expiration date, at block B125, imaging device 20 contacts document lifecycle database 300 to obtain the expiration date. Next at block B130, the expiration date is added to the RFID user data. When it is determined not to use the system-defined expiration date at block B120, at block B135, the user is prompted to manually enter the expiration date via the user interface 22. The manually entered expiration date is then added to the RFID user data at block B130. Method M10 proceeds to block B140 where the RFID copy sheet is fed from the media input tray 41 and the RFID tag thereon is positioned in interrogation zone Z1 where its RFID tag ID is read and it is programmed with the RFID user data. The digital images from the scanned original document are then printed on surfaces of the RFID copy sheet using printer system 30. Thereafter at block B145, imaging device 20 updates the document lifecycle database 300 with the RFID tag ID and the programmed RFID user data of the RFID tag on the RFID copy sheet. Next, at block B150, the RFID user data of the original sheet is updated when the original sheet has its own RFID tag. If not, then this step at block B150 is not performed.

Referring back to block B30 of FIG. 5A, when it is determined that RFID user information is to be extracted from the scanned images, method M10 proceeds to block B50 where the scanned images 700 are displayed on the user interface 22 as shown in FIG. 1. At block B55, the user is prompted to select via the user interface 22 one or more areas, two areas 701, 703, are shown in FIG. 1, of the scanned images from which information will be extracted and added to the RFID user data that will be programmed in the RFID tag on the RFID copy sheet. At block B60, the RFID user data is extracted from the selected areas, such as areas 701, 703. This information may be extracted using OCR. The extracted information may be consolidated and displayed on the user interface 22 for confirmation by the user prior to being saved.

Referring back to block B25, when it is determined that a RFID tag has been detected on the original sheet by RFID reader programmer RP2, method M10 proceeds to block B70 where a determination is made whether or not the user has a credential to create a RFID copy sheet of the original sheet. This is done by having imaging device 20 via controller 21 contact the document lifecycle database 300 via network 100. When it is determined that the user does not have the credential to create the RFID copy sheet, then at block B75 the scanned images of the original sheet are deleted along with the RFID data read from the original sheet. An error message may be displayed on user interface 22 informing the user that the user does not have the credential to make the RFID copy of the original sheet.

When it is determined that the user does have the credential to create the RFID copy sheet at block B70, then at block B80, a determination is made whether or not to add user metadata to the RFID tag of the RFID copy sheet. Again, the user may be prompted using user interface 22 to make a choice regarding the metadata. When it is determined that user metadata is to be added, the user may be prompted using user interface 22 to manually enter this metadata or it may be automatically extracted from the digital images. User metadata may include but not be limited to the user name, imaging device ID, file size, file type, date created, etc. At block B85, the user metadata is added to the RFID user data to be programmed in the RFID tag on the RFID copy sheet.

After either the performance of block B85 or when it is determined at block B80 that no user metadata will be appended, method M10 proceeds to block B90 where a determination is made whether or not a document lifecycle has been enabled for the original sheet. This is done by having the controller 21 of imaging device 20 contact the document lifecycle database 300. When it is determined that the original sheet does not have document lifecycle enabled, then method M10 returns to block B115.

When at block B90, it is determined that the original sheet does have document lifecycle enabled, then at block 100, the document lifecycle information of the original sheet is obtained from the document lifecycle database 300 for use by controller 21. Next, at block B105, a determination is made whether or not copying of the original sheet is allowed. For example, copying of the original sheet at that particular location where imaging device 20 is located may not be permitted or that a limit on the number of copies of the original sheet has been reached. When it is determined that no copying of the original sheet is permitted, then at block B110, the scanned images of the original sheet are deleted along with the RFID data read from the original sheet. A message may be displayed on user interface 22 informing the user that no more copies of the original sheet can be made at that time.

At block B105, when it is determined that copying of the original sheet is permitted, then method M10 proceeds through blocks B115, B120, B125, B130, B135, B140 and B145 as previously described. In addition, however, thereafter at block B150, controller 21 of imaging device 20 sends to the document lifecycle database 300 updated RFID user data for the RFID tag of the original sheet should the original sheet have its own RFID tag indicating that a copy of the original sheet has been made. In addition the RFID tag ID and the programmed RFID user data of the RFID tag on the RFID copy sheet may also be added to the RFID user information of the original sheet. This updated RFID user data for the original sheet will be available to any imaging system that is in communication with databases 200, 300 the next time that that original sheet and its RFID tag are scanned in such imaging systems.

Figure 6A:
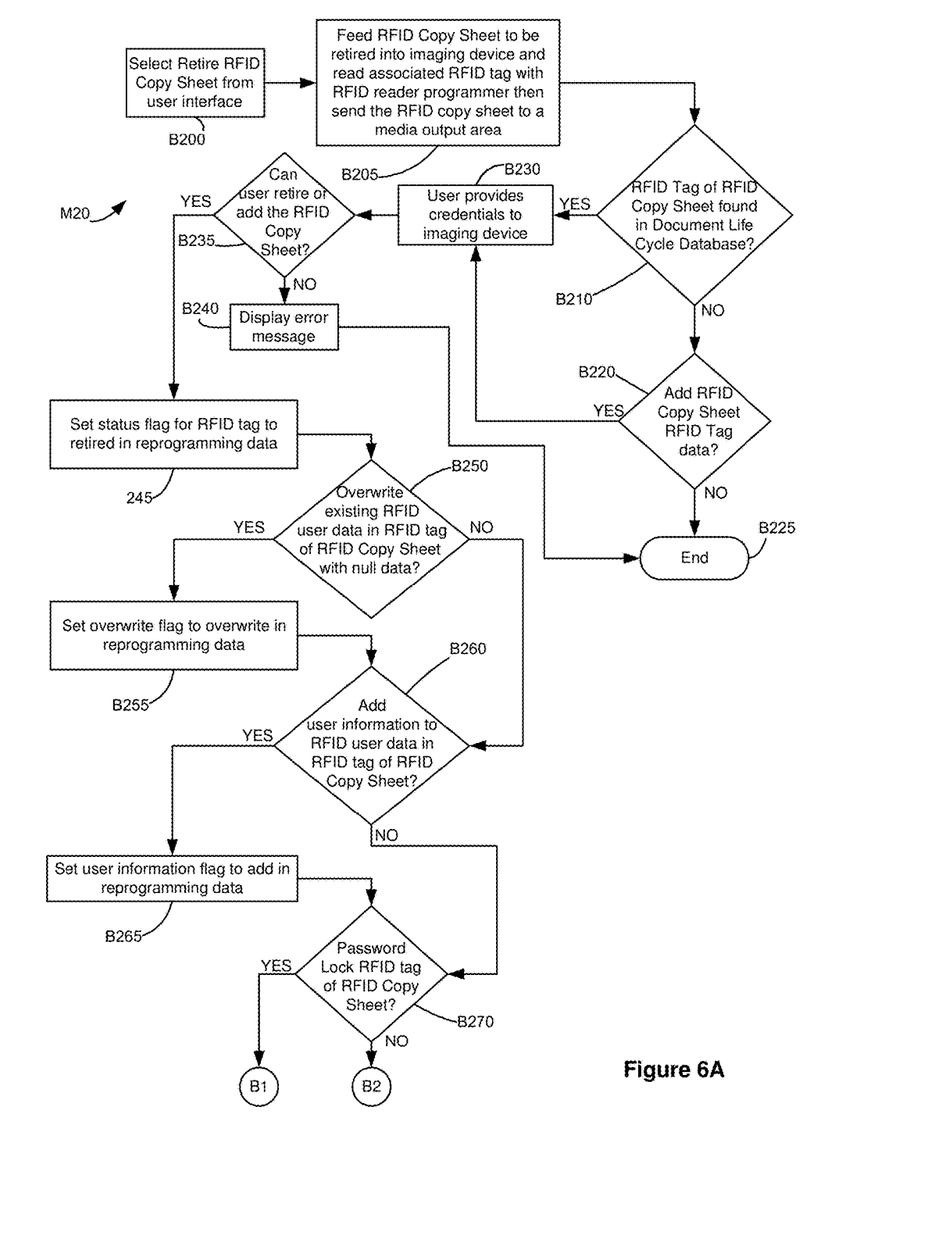
Figure 6B:
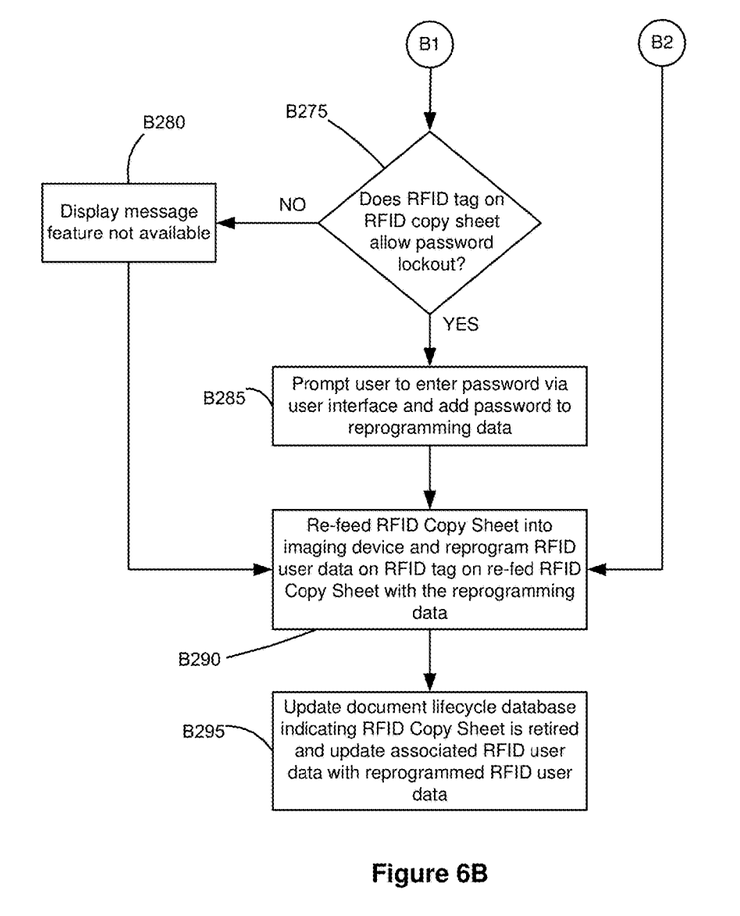

Referring to FIGS. 6A-6B, a method for retiring RFID copies will be described. Generally, RFID copies are retired for many reasons, among them, document security and document tracking. The RFID tag on a RFID copy sheet that is to be retired can be read by either RFID reader programmer RP1 or RP2 or it may be read by one of the two RFID reader programmers and then be reprogrammed by the other of the RFID reader programmers. Briefly, the method M20 for retiring a RFID copy sheet includes reading the RFID tag of the RFID copy sheet to be retired, determining if that sheet is in the document lifecycle database, determining if the user has the authority to retire that RFID copy sheet and if so, then reprogramming the RFID tag to be in a retired status and updating the document lifecycle database to indicate that that RFID copy sheet and its RFID tag have been retired.

Method M20 begins at block B200, by a user selecting a Retire RFID Copy Sheet option presented on a menu shown on the user interface 22. Next at block B205, the RFID copy sheet to be retired is fed into the imaging device 20 and the RFID tag of this RFID copy sheet is read by one of the RFID reader programmers RP1 or RP2. When the RFID copy sheet is fed into ADF 53 of scanner system 50, RFID reader programmer RP2 would be used to read its RFID tag. When the RFID copy sheet is fed into multipurpose feed tray 43, RFID reader programmer RP1 would be used for reading the RFID tag. After the RFID copy sheet RFID tag is read, it is then sent to an output area, output tray 55 of scanner system 50 or output bin 42 of media feed system 40.

At block B210, the life cycle database is queried to determine whether or not the RFID tag of the read RFID copy sheet is in the database. When it is determined that the RFID tag of the read RFID copy sheet is not in the life cycle database, a determination is made at block B220 whether or not to enter the data from the RFID tag of the read RFID copy sheet into the life cycle database. This may be done by prompting the user via the user interface 22. When it is determined that the RFID tag data of the read RFID copy sheet is to be added to the document life cycle database, method M20 proceeds to block B230. When it is determined that the RFID tag data of the read RFID copy sheet is not to be added to the document life cycle database, method M20 proceeds to block B225. Alternatively, when the RFID tag of a RFID copy sheet is not found in the document life cycle database at block B210, method M20 may proceed directly to block B230.

At block B230, the user provides his credentials to the imaging device 20. This may be done using the authentication device 60 or the user interface 22 previously described. After entering the necessary credentials, a determination is made at block B235 whether or not the user can add the read RFID copy sheet to the document lifecycle database and/or retire the read RFID copy sheet. This may be done by querying either the document life cycle database for the RFID tag of the read RFID copy sheet to see if the RFID user data in the RFID tag allows this user the ability to add or retire this document and/or by querying the credentials database to see if this user has the ability to add or retire this document or class of document. When it is determined that the user does not have the correct credentials, at block B240, an error message is displayed on user interface 22 and the method ends at block B225.

When it is determined that the user does have the correct credentials to either add and retire or just retire the read RFID copy sheet, method M20 proceeds to block B245 where a status flag is set to change the status of the RFID tag to retired in the reprogramming data. Next, at block B250, a determination is made whether or not to overwrite the existing RFID user data in the RFID tag of the read RFID copy sheet. This determination may be made either by the user via input provided on the user interface 22 or by using information stored in the document life cycle database for the RFID tag of read RFID copy sheet or for the class of RFID copy sheet of which it is a member. When it is determined that the existing data RFID user data is not be overwritten, method M20 proceeds to block B260. When it is determined that the existing RFID user data of the RFID tag is to be overwritten, at block B255, an overwrite flag is set to overwrite in the reprogramming data for the RFID tag of the read RFID copy sheet and method M20 proceeds to block B260.

At block B260 a determination is made whether or not to append user information to the RFID user data in the RFID tag of the read copy sheet. In one embodiment, this step may automatically or alternately be skipped. In another embodiment, the user may be prompted to enter a determination via the user interface 22. When it is determined to add the user information a user information flag is set in the reprogramming data at block B265. When it is determined not to add user information to the RFID user data in the RFID tag or after the user information flag is set, method M20 proceeds to block B270 where a determination is made whether or not to password lock the RFID tag of the read RFID copy sheet. When it is determined to password lock the RFID tag of the read RFID copy sheet, at block B275, a determination is made whether or not the RFID tag of the read RFID copy sheet have the ability to be password locked. The answer to this may be found in either in the RFID tag information stored in the document life cycle database or when the RFID tag is read by the RFID reader programmer RP1 or RP2. When it is determined that the password lock feature is not available, method M20 proceeds to block B280 where a feature not available message is displayed on the user interface 22. When it is determined that the password lock feature is available, the user is prompted at block B285 to enter a password via the user interface 22 and the password is added to the reprogramming data. After the performance of either block B280 or block 285, method M20 proceeds to block B290.

At block B290, the user is directed to re-feed the read RFID copy sheet into the imaging device 20 and the RFID tag of the re-fed read RFID copy sheet is reprogrammed. A display on the user interface 22 may be used to direct the user to re-feed the read RFID copy sheet into the imaging device 20 and directing the user to insert the read RFID copy sheet into one of the two RFID reader programmers in the imaging device 20. The read RFID copy sheet may be fed to RFID reader programmer RP1 in the media feed system 40 via the multipurpose input tray 43 or into the AFD 53 of scanner system 50. The RFID tag on the re-fed read RFID copy sheet is then reprogrammed in accordance with the reprogramming data. The reprogramming data includes setting the status of the RFID tag to retired, and, depending on the state of the various flags, overwriting the existing user data in the RFID tag with null data, adding user information to the RFID user data of the RFID tag, and setting a password.

At block B295 the document life cycle database is updated with the retired status of the RFID tag and read RFID copy sheet and the RFID user data is updated with the reprogramming data.

The foregoing description of several example embodiments of the disclosed method have been presented for purposes of illustration. It is not intended to be exhaustive or to limit the disclosed method to the precise steps disclosed, and obviously many modifications and variations are possible in light of the above teaching. It is intended that the scope of the invention be defined by the claims appended hereto.

What is claimed is:

1. In an imaging device having a user interface and at least one of a printer system, a scanner system and a media output area, the printer system having a first radio frequency identification (RFID) reader programmer positioned along a media path therein for reading and programming a RFID tag on a RFID copy sheet, the scanner system having a second RFID reader programmer positioned along a media path therein for reading and programming the RFID tag on the RFID copy sheet, the imaging device being in communication with a document lifecycle database and a user credentials database, a method for retiring the RFID copy sheet, comprising:

reading a RFID tag data including a RFID user data of the RFID copy sheet to be retired using one of the first and second RFID reader programmers;

sending the read RFID copy sheet to the media output area;

determining whether or not the RFID tag data of the read RFID copy sheet is in the document lifecycle database;

upon determining that the RFID tag data of the read RFID copy sheet is not in the document lifecycle database, determining whether or not to add the RFID tag data to the document lifecycle database;

upon one of determining one of adding the RFID tag data of the read RFID copy sheet to the document lifecycle database and determining that the RFID tag data of the read RFID copy sheet is in the document lifecycle database, determining by querying at least one of the user credentials database and the document lifecycle database one of whether or not a user has a credential to retire the read RFID copy sheet and whether or not the user has a credential to add the RFID tag data of the read RFID copy sheet to the document lifecycle database and retire the read RFID copy sheet;

upon determining that the user has the credential to retire the read RFID copy sheet, setting a status flag for the RFID tag to retire in a reprogramming data;

upon determining that the user has the credential to add and retire the read RFID copy sheet, adding the RFID tag data of the read RFID copy sheet to the document lifecycle database and setting the status flag for the RFID tag to retire in the reprogramming data;

determining whether or not to overwrite the RFID user data in the RFID tag of the read RFID copy sheet;

upon determining that the RFID user data is to be overwritten, setting an overwrite flag to overwrite in the reprogramming data;

upon one of determining not to overwrite the RFID user data in the RFID tag of the read RFID copy sheet and setting an overwrite flag to overwrite in the reprogramming data, determining whether or not to add a user information to the RFID user data in the RFID tag of the read RFID copy sheet;

upon determining that the user information is to be added to the RFID user data of the RFID tag of the read RFID copy sheet, setting a user information flag to add in the reprogramming data;

upon one of determining the user information is not to be added to the RFID user data of the RFID tag of the read RFID copy sheet and setting the user information flag to add in the reprogramming data, determining whether or not to password lockout the RFID tag of the read RFID copy sheet;

upon determining to password lockout the RFID tag of the read RFID copy sheet, determining by querying the document lifecycle database whether or not the RFID tag of the read RFID copy sheet allows the password lockout;

upon determining that the RFID tag allows the password lockout, prompting the user to enter a password using the user interface and adding the password to the reprogramming data;

upon one of the entering the password via the user interface and determining that the RFID tag of the read RFID copy sheet does not allow the password lockout, re-feeding the read RFID copy sheet into the imaging device, and, using one of the first and second RFID reader programmers, reprogramming the RFID user data on the RFID tag with the reprogramming data to set the RFID tag to a retired status, and, when selected, overwriting the existing RFID user data, and, when present, adding the user information and the password to the RFID user information of the RFID tag of the read RFID copy sheet.

2. The method of claim 1 further comprising upon determining not to add the RFID tag data of the read RFID copy sheet to the document lifecycle database, ending the method.

3. The method of claim 1 further comprising upon determining one of that the user does not have the credential to retire the read RFID copy sheet and that the user does not have the credential to add and retire the read RFID copy sheet, displaying an error message and ending the process.

4. The method of claim 1 further comprising updating in the document lifecycle database an existing RFID user information associated with the RFID tag of the read RFID copy sheet to match the reprogrammed RFID user data of the RFID tag of the read RFID copy sheet including indicating that the RFID tag of the read RFID copy sheet is retired.

5. In an imaging device having a user interface and at least one of a printer system, a scanner system and a media output area, the printer system having a first radio frequency identification (RFID) reader programmer positioned along a media path therein for reading and programming a RFID tag on a RFID copy sheet, the scanner system having a second RFID reader programmer positioned along a media path therein for reading and programming the RFID tag on the RFID copy sheet, the imaging device in communication with a document lifecycle database and a user credentials database, a method for retiring the RFID copy sheet, comprising:

selecting a retire RFID copy sheet from the user interface;

reading a RFID tag data including a RFID user data of the RFID copy sheet to be retired using one of the first and second RFID reader programmers;

sending the read RFID copy sheet to the media output area;

determining whether or not the RFID tag data of the read RFID copy sheet is in the document lifecycle database;

upon determining that the RFID tag data of the read RFID copy sheet is not in the document lifecycle database, determining whether or not to add the RFID tag data to the document lifecycle database;

upon determining not to add the RFID tag data of the read RFID copy sheet to the document lifecycle database, ending the method;

upon determining one of adding the RFID tag data of the read RFID copy sheet to the document lifecycle database and determining that the RFID tag data of the read RFID copy sheet is in the document lifecycle database, determining by querying at least one of the user credentials database and the document lifecycle database one of whether or not a user has a credential to retire the read RFID copy sheet and whether or not the user has a credential to add the RFID tag data of the read RFID copy sheet to the document lifecycle database and retire the read RFID copy sheet;

upon determining that the user has the credential to retire the read RFID copy sheet, setting a status flag for the RFID tag to retire in a reprogramming data;

upon determining that the user has the credential to add and retire the read RFID copy sheet, adding the RFID tag data of the read RFID copy sheet to the document lifecycle database and setting the status flag for the RFID tag to retire in the reprogramming data;

determining whether or not to overwrite the RFID user data in the RFID tag of the read RFID copy sheet;

upon determining that the RFID user data is to be overwritten, setting an overwrite flag to overwrite in the reprogramming data;

upon one of determining not to overwrite the RFID user data in the RFID tag of the read RFID copy sheet and setting an overwrite flag to overwrite in the reprogramming data, determining whether or not to add a user information to the RFID user data in the RFID tag of the read RFID copy sheet;

upon determining that the user information is to be added to the RFID user data of the RFID tag of the read RFID copy sheet, setting a user information flag to add in the reprogramming data;

upon one of determining the user information is not to be added to the RFID user data of the RFID tag of the read RFID copy sheet and setting the user information flag to add in the reprogramming data, determining whether or not to password lockout the RFID tag of the read RFID copy sheet;

upon determining to password lockout the RFID tag of the read RFID copy sheet, determining by querying the document lifecycle database whether or not the RFID tag of the read RFID copy sheet allows the password lockout;

upon determining that the RFID tag allows the password lockout, prompting the user to enter a password using the user interface and adding the password to the reprogramming data;

upon one of entering the password via the user interface and determining that the RFID tag of the read RFID copy sheet does not allow the password lockout, re-feeding the read RFID copy sheet into the imaging device, and, using one of the first and second RFID reader programmers, reprogramming the RFID user data on the RFID tag of the read RFID copy sheet with the reprogramming data to set the RFID tag to a retired status, and, when selected, overwriting the existing RFID user data, and, when present, adding the user information and the password to the RFID user information of the RFID tag of the read RFID copy sheet; and updating in the document lifecycle database an existing RFID user information associated with the RFID tag of the read RFID copy sheet to match the reprogrammed RFID user data of the RFID tag of the read RFID copy sheet including indicating that the RFID tag of the read RFID copy sheet is retired.

* * * * *